United States Patent [19]

Netkowicz et al.

[11] Patent Number: 5,152,891
[45] Date of Patent: Oct. 6, 1992

[54] SELF-CLEANING STRAINER

[75] Inventors: Robert J. Netkowicz; Carl A. Steiner; Michael S. O'Connell, all of Erie, Pa.

[73] Assignee: T/M Industrial Supply, Inc., Erie, Pa.

[21] Appl. No.: 581,742

[22] Filed: Sep. 13, 1990

[51] Int. Cl.⁵ .............. B01D 29/64; B01D 29/66; B01D 29/68; B01D 29/35
[52] U.S. Cl. ................. 210/408; 210/409; 210/413; 210/415; 210/396; 210/403; 209/250; 209/273; 209/304; 209/306; 209/380; 55/498
[58] Field of Search ............ 209/273, 380, 250, 306, 209/304; 210/408, 409, 413, 415, 403, 414, 396; 55/498

[56] References Cited

U.S. PATENT DOCUMENTS

| | | | |
|---|---|---|---|
| 1,106,808 | 8/1914 | Haug | 209/380 |
| 1,512,977 | 10/1924 | Depue | 210/415 |
| 2,834,478 | 5/1958 | Macdonald | 211/136 |
| 3,081,873 | 3/1963 | Cowan | 209/273 |
| 3,168,467 | 2/1965 | Dreyer | 210/415 |
| 3,437,204 | 4/1969 | Clarke-Pounder | 209/273 |
| 3,471,024 | 10/1969 | Doucet | 210/225 |
| 4,267,035 | 5/1981 | Martin | 209/273 |
| 4,303,522 | 12/1981 | Ducasse | 210/408 |
| 4,315,820 | 2/1982 | Mann et al. | 210/408 |
| 4,328,103 | 5/1982 | Kraeling et al. | 210/411 |
| 4,399,042 | 8/1983 | Stannard et al. | 210/791 |
| 4,412,920 | 11/1983 | Bolton | 210/409 |
| 4,643,828 | 2/1987 | Barzuza | 210/415 |
| 4,697,982 | 10/1987 | Hooper | 209/273 |
| 4,702,847 | 10/1987 | Fux et al. | 210/798 |
| 4,762,615 | 8/1988 | Drori | 210/333.01 |
| 4,818,402 | 4/1989 | Steiner | 210/411 |
| 4,859,335 | 8/1989 | Whyte | 210/393 |
| 4,867,879 | 9/1989 | Muller | 210/392 |
| 4,880,539 | 11/1989 | Crawford et al. | 210/408 |
| 4,941,971 | 7/1990 | Albright | 210/409 |

FOREIGN PATENT DOCUMENTS

| | | | |
|---|---|---|---|
| 232128 | 8/1987 | European Pat. Off. | 210/409 |
| 520734 | 3/1955 | Italy | 210/408 |
| 11886 | 3/1980 | Japan | 210/413 |

Primary Examiner—Stanley S. Silverman
Assistant Examiner—Thomas M. Lithgow
Attorney, Agent, or Firm—Webb, Burden, Ziesenheim & Webb

[57] ABSTRACT

A backwash strainer including a body, a strainer element having an inlet side contained in the body, and a space defined between the body and the strainer element. The body includes an inlet to the strainer element and an outlet from the annular space. A nozzle for directing cleaning fluid against the inlet side of the strainer element for dislodging particulate matter from the inlet side of the strainer element mounts to the body. A backwash arm for collecting the cleaning fluid and dislodging particulate matter mounts to the body. The backwash arm is positioned adjacent to and is in close proximity to the inlet side of the strainer element and the nozzle. The backwash arm has an axially extending slot defined by two spaced members having ends positioned adjacent to the nozzle. The backwash arm and the nozzle together may be moveable about a central axis relative to the strainer element.

13 Claims, 3 Drawing Sheets

SELF-CLEANING STRAINER

FIELD OF THE INVENTION

Our invention relates to improvements in automatic strainers or filters. More particularly our invention relates to strainers for a fluid media carrying fibrous or other forms of debris which tend to mat, staple and clog the strainers.

DESCRIPTION OF THE PRIOR ART

Fluid strainers have been employed for many years. They remove solids from fluid. The solids are collected on screening media or strainer elements and thereafter the solids are removed from the screening media by backwashing. During backwashing a portion of the fluid being strained is caused to flow in a reverse direction through a backwash arm to clean the media, such as that described in U.S. Pat. No. 4,818,402 which is hereby incorporated by reference. As used herein, the term backwash arm refers to a suction chamber or collection duct.

Typically, these strainers are installed on the discharge side of pumps which have operating pressures, usually in excess of 0 psig with the backwash arms discharging to atmospheric pressure. These high differential pressures may be effectively used to backwash self-cleaning strainers. High differential pressures result in high fluid velocities across the straining element in the backwashing mode of operation. The high fluid velocities remove debris collected on the straining element. However, in applications which require the strainer on the suction side of the system, due to space limitations and/or for pump protection, the differential pressure available may only be 5 psig or less. This normally is an insufficient pressure differential to effectively clean the straining element.

One method used to overcome low pressure normally available for backwashing has been to direct an external source of backwash cleaning fluid to the strainer at the clean side of the element, and through the element and into a backwash collection arrangement. Although this method is effective, it requires a large amount of cleaning fluid, such as water, usually 3-5% of the total fluid flow through the unit. This represents an excessive use of clean, high pressure water.

It is an object of our invention to provide a strainer for low pressure applications which uses less cleaning fluid and is less expensive to operate than the prior art strainers.

SUMMARY OF THE INVENTION

Our invention is a fluid strainer that includes a base and a cleaning assembly attached to the base. The strainer element, which may have a hollow cylindrical shape, attaches to the base through which a fluid being filtered, such as water, must pass. The strainer element has an inlet side and an outlet side. The fluid being filtered passes from the inlet side to the outlet side. The cleaning assembly includes at least one nozzle mounted to the base. The nozzle directs cleaning fluid, which can be water, against the inlet side of the strainer element to dislodge particulate matter from the inlet side of the strainer element. The cleaning assembly also includes a backwash arm for collecting the cleaning fluid and particulate matter. The backwash arm mounts to the chamber and is positioned adjacent to the inlet side of the filter and adjacent to the nozzle. The cleaning assembly may be positioned in the interior of the strainer element. The strainer is particularly well adapted for low-pressure operating conditions, say 5 psig or less.

The fluid may be fluid which has passed through the strainer element. Further, the nozzle may direct fluid to come in contact with the inlet side of the strainer element at an acute incident angle with respect to the tangent to the inlet side of the strainer element at the point of contact of the directed fluid. For example, the nozzle may be positioned at approximately a 45 degree angle with respect to the tangent at the cleaning fluid point of contact with the inlet side of the strainer element. The nozzle may be mounted to a nozzle conduit which is mounted to the backwash arm. There may also be a plurality of nozzles mounted to the arm.

The nozzle and the cleaning assembly may be moved relative to the strainer element by a motor which rotates the cleaning assembly about a central axis. The nozzle and backwash arm may move in concert with each other.

The nozzle may include a tip that is positioned in close proximity to the inlet side of the strainer element and an inlet end of the backwash arm so that the cleaning fluid exiting from the nozzle tip contacts the inlet side of the strainer element thereby dislodging particulate matter which then enters the inlet end of the backwash arm.

The strainer may also include a body, a strainer element having an inlet side contained in the body, and a space defined between the body and the strainer element. The body further includes an inlet to the strainer element and an outlet from the space. A cleaning assembly attaches to the body and includes a nozzle for directing cleaning fluid against the inlet side of the strainer element for dislodging particulate matter from the inlet side of the strainer element mounted to the body. The backwash arrangement also includes a backwash arm for collecting the cleaning fluid and dislodged particulate matter mounted to the body. The backwash arm is positioned adjacent to both the inlet side of the strainer element and the nozzle. The backwash arm has an axially extending slot defined by two spaced members having ends positioned adjacent to the nozzle. The backwash arm and the nozzle together are moveable about a central axis relative to the strainer element. A motor can be mounted to the body for moving the backwash arm and the nozzle.

DESCRIPTION OF THE PREFERRED EMBODIMENT

Figure 1:
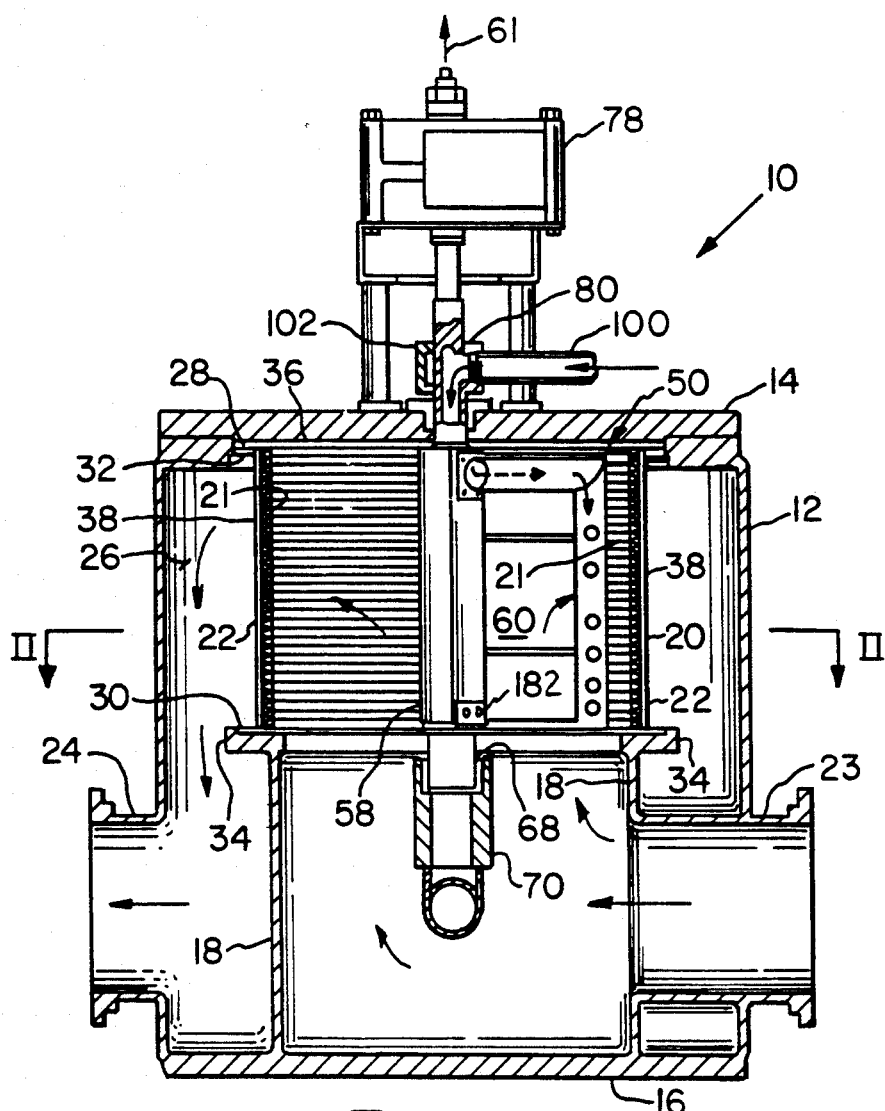
FIG. 1 is a plan view of a self-cleaning strainer, partially in section, made in accordance with the present invention showing a cleaning assembly made in accordance with the present invention.
Figure 2:
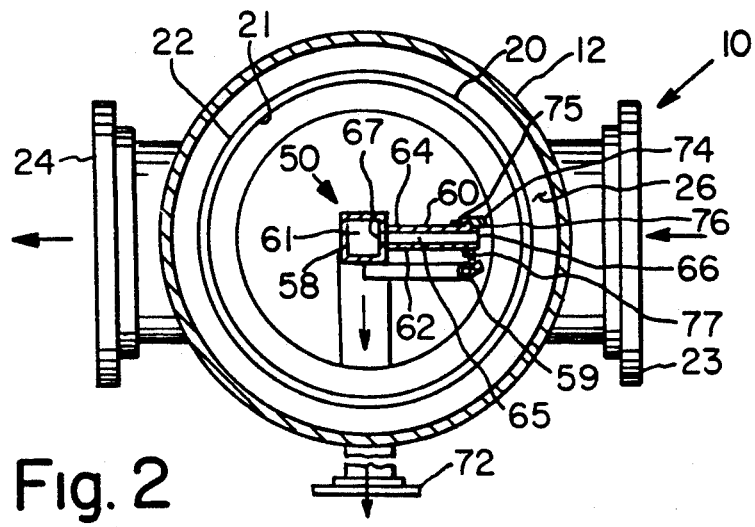
FIG. 2 is a section taken along lines II—II in FIG. and showing a backwash arrangement made in accordance with the present invention.

FIGS. 1 and 2 show a strainer 10 having a cylindrical body 12 with a closed top 14 and a closed bottom 16. The body 12 has a generally cylindrical partition 18 defining a hollow inlet chamber which partition 18 also functions as a support for a hollow cylindrical strainer element 20 attached thereto. The strainer element 20 has an inlet side 21 and an outlet side 22 through which fluid being filtered must pass. The closed top 14 also forms a closure for one end of the strainer element 20. The partition 18 rests on the closed bottom 16 disposed concentrically in a lower portion of the body 12. The partition 18 includes an inlet port and likewise the body 12 has an inlet port positioned to communicate therewith. An inlet tube 23 passes through both inlet ports and is welded to both the body 12 and the partition 18 about the respective edges of the inlet holes. The body 12 also includes an outlet port positioned 180 degrees from the body inlet port. An outlet tube 24 passes through the outlet port and is welded to the body 12 about the outlet port edge.

The strainer element 20 is concentrically disposed inside the body 12 on the partition 18 whereby a space 26 is defined between an inner surface of the body 12 and both an outer surface of the strainer element 18 and an outer surface of the cylindrical partition. The strainer element 20 is held in place by a locking arrangement. Specifically, the strainer element has a first circular plate-like locking ring 28 attached to an upper end of the strainer element 20 and a second circular plate-like locking ring 30 attached to a lower end of the strainer element 20. A first receiving ring 32 mounts, preferably by welding, to an upper portion of the body 12 and engagingly receives first locking ring 28. A second receiving ring 34 mounts, preferably by welding, to an upper edge of the partition 18 and engagingly receives the second locking ring 30. The receiving rings 32, 34 are machined so as to each have a concentric step. This enables the receiving rings 32, 34 to guide and support the strainer element 20.

The strainer element 20, as shown in FIGS. 1 and 2, is made of a plurality of spaced concentric rings 36, triangular in cross section, stacked with a space of, for example, 0.003 to 0.025 inches between them. Spaced vertical rods 38 hold rings 36 in position and the locking rings 28, 30 attach to respective ends of rods 38.

Figure 3:
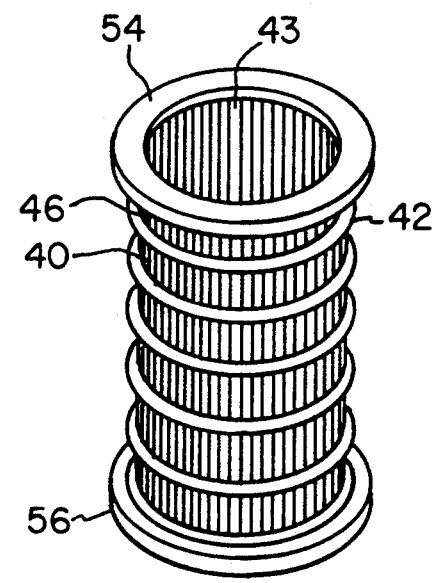
FIG. 3 is a perspective view of a strainer element.

Alternatively, as shown in FIG. 3, the strainer element 20 can include a plurality of vertically disposed and closely spaced straight triangular bars 40 having a base 43 and apex 46 which form a hollow cylinder. The bases 43 of the bars 40 face inwardly and their apexes 46 face outwardly. A plurality of circular rings 42 are disposed perpendicular to bars 40. Like bars 40, the rings 42 are triangular in cross section having a base and an apex. Rings 42 hold together bars 40 in spaced relation to one another by being attached at their apexes 50 to bases 43 of bars 40. The spaces between the bars 40 can vary in size from 0.003 inches to 0.250 inches and larger, depending on the material being handled. A plate-like third locking ring 54 and a plate-like fourth locking ring 56 are fixedly to opposite ends of bars 40. Although two embodiments of the strainer element 20 are shown, it is to be understood that any suitable strainer element may be used with the present invention.

The strainer further includes a cleaning assembly 50 attached to a rotatable square cross-section collection shaft 58 positioned in the interior of the strainer element. The cleaning assembly 50 includes a nozzle assembly 59 and a backwash arm 60 attached to the rotatable hollow square collection shaft 58. The shaft 58 is coaxial with the cylindrical strainer element 20 about central axis 61. The backwash arm 60, which collects cleaning fluid and particulate matter, extends radially outwardly from the shaft 58 and has two spaced plates 62 and 64 defining an axial slot 65 having an inlet end 66 and forming a suction member. The slot 65 communicates with a slot 67 in shaft 58. The shaft 58 and the arm 60 rotate about the central axis 61. Outer ends of the plates 62 and 64 terminate in close spaced relation to the inner surface of the strainer element 20 and is on the order of ⅜ inch to 1 inch.

A hollow bearing 68 receives a lower end of the shaft 58 and a collection pipe 70 supports the bearing 68. The arm 60, the shaft 58, the bearing 68 and the pipe 70 form a hydraulic circuit where collected fluid flows from the arm 60 through the shafts 58, the bearing 68 and the pipe 70, and discharges through an outlet 72 of the pipe 70 which may be connected to a drain at atmospheric pressure.

Figure 4:
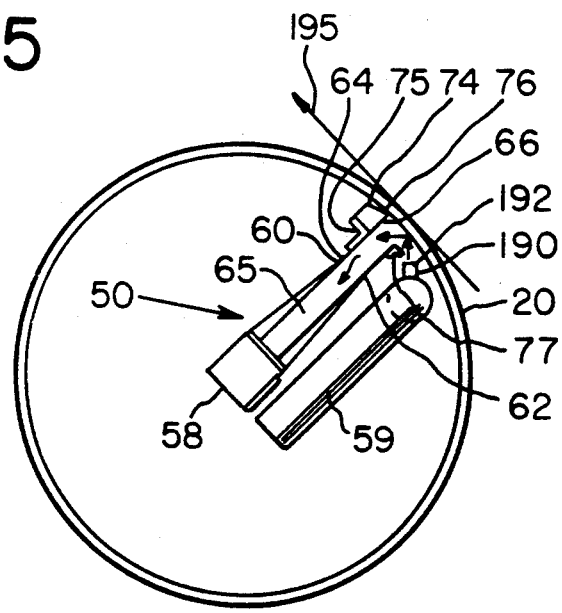
FIG. 4 is a top view of the cleaning assembly and strainer element.

As shown in FIG. 4, the arm 60 has a brass scraping bar 74 for scraping particulate matter from the strainer element. The bar 74 is supported on plate 64 by a bracket 75. Bar 74 is trapezoidal in cross section and terminates in a corner portion 76, which is in close spaced relation to the inside surface of the strainer element 20, say on the order of 1/32 inch. The scraping bar 74 scrapes particulate matter from the inlet side 21 of the strainer element 20. The plate 64 has an L-shaped fluid deflector 77 mounted thereto. Both plates 62 and 64 have support gussets mounted thereto.

A motor and speed reducer unit 78 are supported on the top 14 of body 12 and have a gear reduction unit or other suitable drive 80 extending through a packing 82 into the interior of the strainer element 20. Shaft 58 operatively connects to a lower section of the drive 80 positioned in the interior of the strainer element 20.

Figure 5:
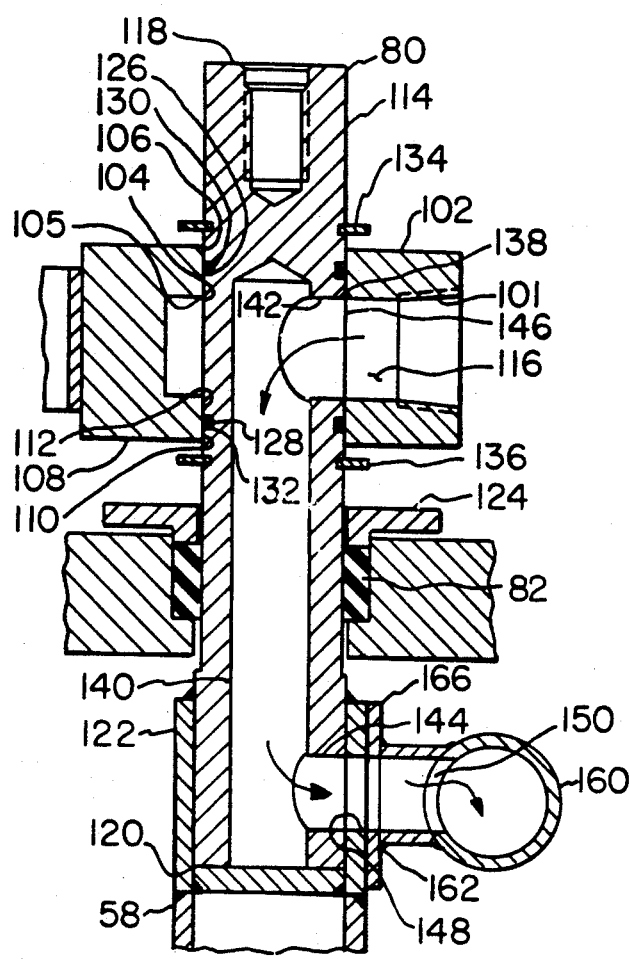
FIG. 5 is a partial sectional view of the cleaning fluid supply path of the self-cleaning strainer made in accordance with the present invention.

Referring to FIG. 5, the nozzle assembly 59 includes a cleaning fluid inlet tube 100 positioned above the strainer top 14. The tube 100 is received by a tube receiving bore 101 of a cylindrical cleaning fluid housing 102. The cleaning fluid housing 102 includes a circular first surface 104 having a first centrally positioned hole 105 defined by a first edge 106 and a circular second surface 108 having a coaxial second hole 110 defined by a second edge 112. A cylindrical shaft 114, which is part of drive 80, passes through the first hole and second hole. A space 116 is defined between the interior of the cleaning fluid housing 102 and the exterior surface of the shaft 114. One end 118 of the shaft 114 operatively connects to the reducer unit 78 and another end 120 of the shaft 114 operatively connects to a receiving sleeve 122 of the backwash shaft 58. Both end 120 and the receiving sleeve 122 are square cross-sectional shaped.

The closed top 14 contains the packing element 82 held in place by a circular bearing 124. The shaft 114 passes through the top 14, packing 82 and bearing 124 into the interior of the strainer element 20. The outer surface of the shaft 114 includes two O-ring receiving grooves 126, 128 spaced apart from one another and positioned adjacent the first edge 106 and the second edge 112, respectively. O-rings 130, 132 are received by O-ring receiving grooves 126, 128 and are sandwiched between the shaft 114 and first edge 106 and second edge 112 respectively forming a liquid seal between the chamber 102 and the shaft 114. Two stops 134, 136 prevent movement of the cleaning fluid housing 102 along the shaft 114 and mount to the outer surface of the shaft 114. The stops 134 and 136 are positioned adjacent the housing first surface 104 and the housing second surface 108, respectively. The stops 134, 136 prevent the cleaning fluid housing 102 to move extensively along the shaft 114. The shaft 114 further includes a U-shaped bore 138 having a coaxial section 140 and two spaced apart transverse sections 142, 144 having open ends 146, 148. Opening 146 is contained within cleaning fluid housing 102 adjacent to space 116.

As stated previously, end 120 of the shaft 114 operatively connects to the receiving sleeve 122, specifically, the sleeve 122 is positioned at an end of the backwash shaft 58 and is circular in shape having a closed end which abuts against an opening of the coaxial section 140 of the U-shaped bore 138. The shaft 114 fixedly mounts to the sleeve 122 by, for example, welding or interference fit. The sleeve 122 has a circular opening 150 coaxial with and adjacent to opening 148.

Figure 6:
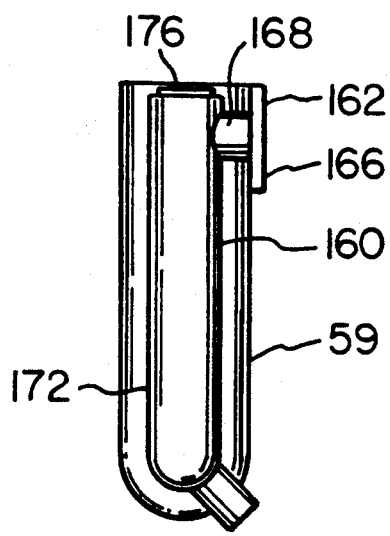
FIG. 6 is a top view of a nozzle assembly of the cleaning assembly.
Figure 7:
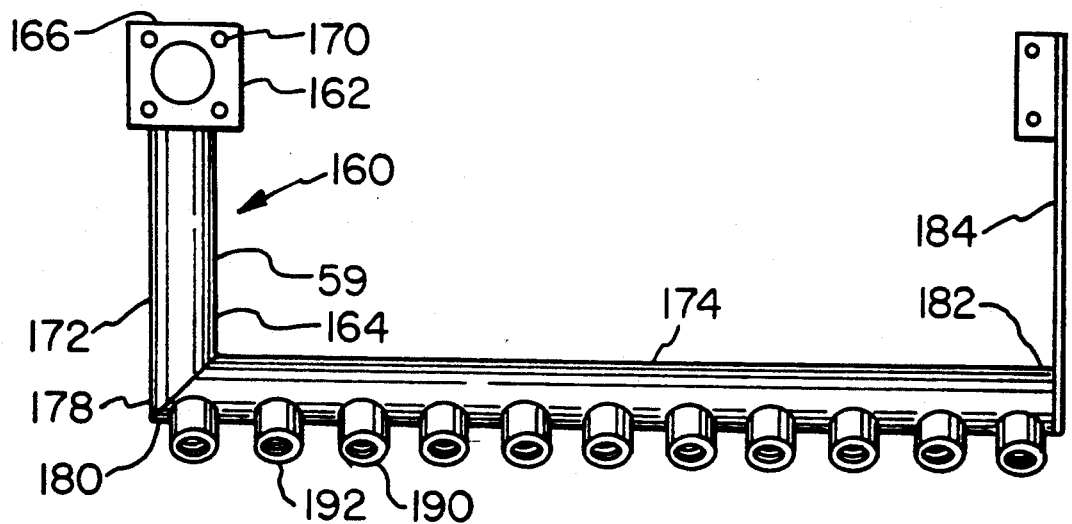
FIG. 7 is a plan view of the nozzle assembly shown in FIG. 6.

The nozzle assembly 59 further includes a nozzle conduit 160, shown in FIGS. 6 and 7, which mounts to the backwash shaft 56. The conduit 160 includes a coupling member 162 mounted to an L-shaped hollow pipe 164, as shown in FIGS. 6 and 7. The coupling member 162 has a square mounting plate 166 having a central hole and four bolt receiving holes 170 adjacent to respective corners of the plate which receive four threaded shafts welded to the sleeve 122. The plate 166 is welded to a hollow tube 168. Appropriate hardware fastens the plate 166 to the sleeve 122 so that the sleeve opening 150 and the plate hole are coaxial with one another and the hollow tube depends therefrom.

The L-shaped hollow pipe 164 includes a cylindrical hollow first leg 172 and a cylindrical hollow second leg 174. The first leg 172 has a closed first end 176, and a mitred opened second end 178. An end of the tube 168 passes through a tube receiving bore on the first leg 172 and is welded thereto. The second leg 174 includes a mitred first end 180, an open second end 182 and a plurality of nozzle receiving holes extending along the length thereof. The mitred first end 180 of the second leg 174 is welded to the mitred second end 178 of the first leg 172 so that the second leg 174 depends 90 degrees from the first leg 172 and longitudinal central axes passing through both the second leg and the collection shaft are parallel to each other. A support bracket 184 has one end mounted to and closing off the second end 182 of the second leg 174 and the other end of the support bracket 182 mounts to the backwash shaft 58.

Each nozzle receiving hole has a respective nozzle 190 mounted thereto. The nozzles direct cleaning fluid to the inlet side of the strainer for dislodging particulate matter from the inside of the strainer element. Although eleven nozzles are shown, any number may be used. The nozzles have smaller internal diameters in comparison to the nozzle conduit 160, for example ⅜ inch to 1 inch. The function of the nozzles 190 is to direct cleaning fluid toward the inlet side 22 of the strainer 20 and to convert the high pressure cleaning fluid entering the inlet tube into high velocity cleaning fluid exiting the nozzles at nozzle tips 192. The exiting of the cleaning fluid is a function of the incoming fluid pressure, which should be on the order of 20-40 psig, and the number and spacing of the nozzles 190 which can be determined on a case by case basis. Specifically, the nozzle tips 192 are positioned adjacent to the backwash arm outer ends, facing in the direction of the backwash arm and adjacent to and in close proximity to the inlet side of the strainer element 20 approximately several inches or less.

Preferably, the nozzle tip 192 is positioned adjacent to and in close proximity to both the inlet side 22 of the strainer element 20 and the inlet end 66 of the backwash arm 60 so that cleaning fluid exiting from the nozzle tip 192 contacts the inlet side 22 of the strainer element 20 dislodging particulate matter which enters the inlet end 66 of the backwash arm 60. Preferably, the nozzles 190 discharge cleaning fluid at an acute incident angle, such as 45 degrees, with respect to the tangent 195 to the inlet side of the strainer element at the point of contact of the directed cleaning fluid. Preferably, the nozzles are positioned at approximately a 45 degree angle with respect to the tangent of the cleaning fluid point of contact with respect to the inlet side of the strainer.

In operation, when a supply of fluid, such as water, to be filtered is connected to the inlet tube 14, it flows through the strainer element 20 and discharges through the outlet 16 as shown by the arrows in FIGS. 1 and 2. Particulate matter is filtered from the fluid by being lodged on inlet side 21 of the strainer element 20. The fluid passes through the strainer element 20 and exits from the outlet side 22 thereof. Pressurized cleaning fluid, such as water, from an external source enters the inlet tube 100, passes through the cleaning fluid chamber 102, shaft 114, and nozzle conduit 160, and exits through the plurality of nozzles 190 at the acute incident angle with respect to the tangent 195 of the strainer element 20. As is evident, the pressurized cleaning fluid is maintained at a pressure greater than that of the fluid flowing through the chamber. The cleaning fluid can be fluid which has passed through the strainer element 20. The exiting cleaning fluid then reflects off of the inlet side 21 of the strainer element 20 with dislodged particulate matter into the backwash arm 60 between plates 60-62 through the inlet end 66. The L-shaped deflector 77 assists in directing the particulate matter and cleaning fluid into the backwash arm 60. In addition to the exiting cleaning fluid, fluid passing through the strainer 10 will also flow through backwash arm 60. The dislodged particulate matter then flows through the backwash shaft 58, bearing 68 and collection pipe 70.

Typically, the collection pipe enters into a sump maintained at atmospheric pressure. The pressure differential between the fluid passing through the strainer element 20 and discharge causes the fluid and particulate matter to flow from the backwash arm 60 to the sump.

The motor and speed reducer unit, when activated, rotate or move the backwash arm 60 and nozzles 190 in concert to each other and relative to the strainer element 20 and permits the complete filter 20 to be cleaned. Of course it is possible to keep the backwash arm 60 and nozzles 190 stationary and rotate the strainer element 20.

The above-described strainer 10 results in superior cleaning of the strainer element 20 than that of the backwash methods used in the prior art where limited pressurized fluid is available. This is especially true when the operating pressure is low, say on the order of 5 psig or less. Further, it has been our experience that the amount of cleaning fluid required in this arrangement is on the order of one-tenth the amount which is required through normal backwash operations, resulting in a substantial savings to the user of the cleaning device.

Having described the presently preferred embodiments of our invention, it is to be understood that it may otherwise be embodied within the scope of the appended claims.

We claim:

1. A fluid strainer comprising:
    a body having a chamber for receiving a strainer and an inlet cavity;
    a strainer element attached to said body and positioned within said chamber through which a fluid being filtered must pass, means for feeding and maintaining said fluid at a straining pressure in said inlet cavity, said strainer element having an inlet side and an outlet side, through which the fluid being filtered passes from said inlet cavity, through said inlet side and then through said outlet side; and
    a cleaning assembly comprising:
    a nozzle means for directing pressurized cleaning fluid maintained at a pressure greater than the straining pressure of the fluid being filtered flowing through said nozzle element against said inlet side of said strainer element for dislodging particulate matter from said inlet side of said strainer element, said nozzle means positioned within said inlet cavity and adjacent to an inlet side of said strainer element;
    an inlet conduit means attached to said body and attached to said nozzle means and extending external of said inlet cavity and said body for bringing said cleaning fluid from a fluid supply source external of said inlet cavity to said nozzle; and
    an arm means for collecting the dislodged particulate matter having a suction member defining a suction member opening, said arm means mounted to said body and positioned within said inlet cavity adjacent to said inlet side of said strainer element and adjacent to said nozzle means, said arm means and said nozzle means attached to each other forming an arm means nozzle means assembly, at least one of said arm means nozzle means assembly and said strainer element being moveably mounted relative to the other, and wherein said nozzle means is positioned in a manner to direct the cleaning fluid to come in contact with said inlet side of said strainer at an acute incident angle with respect to the inlet side of the strainer element at the point of contact of the directed cleaning fluid so that cleaning fluid reflects off the inlet side of said straining element and flows with the dislodged particulate matter into the opening of said suction member.

2. The strainer of claim 1 wherein said strainer element is in the shape of a hollow cylinder.

3. The strainer of claim 2 wherein said nozzle means directs the cleaning fluid to come in contact with said inlet side of said strainer element at an acute incident angle with respect to the tangent to the inlet side of the strainer element at the point of contact of the directed cleaning fluid.

4. The strainer of claim 3 wherein said nozzle means is positioned at approximately a 45 degree angle with respect to the tangent at the cleaning fluid point of contact with said inlet side of said strainer element.

5. The strainer of claim 1 wherein said nozzle means comprises a nozzle conduit and at least one nozzle mounted to said nozzle conduit.

6. The strainer of claim 5 further comprising a plurality of nozzles directed toward said inlet side of said strainer element mounted to said nozzle conduit.

7. The strainer of claim 1 further comprising a motor mounted to said body and said cleaning assembly rotatably mounted to said motor wherein when said motor is activated, said motor rotates said cleaning assembly about a central axis.

8. The strainer of claim 1 said nozzle means includes a tip positioned in close proximity to said inlet side of said strainer element and an inlet end of said arm means so that cleaning fluid exiting from said nozzle tip contacts the inlet side of said strainer element thereby dislodging particulate matter which then enter the inlet end of said arm means.

9. The strainer as claimed in claim 1 wherein said suction member opening includes an axially extending slot defined by two spaced members having ends positioned adjacent to said nozzle means.

10. The strainer as claimed in claim 9 wherein at least one of said spaced members includes a deflector for assisting directing the cleaning fluid and the particulate matter into said suction member.

11. The strainer as claimed in claim 10 wherein said deflector is L-shaped.

12. The strainer as claimed in claim 1 wherein said arm means includes a deflector for assisting directing the cleaning fluid and the particulate matter into said suction member opening.

13. The strainer as claimed in claim 12 wherein said deflector is L-shaped.

* * * * *